(12) United States Patent
Gretz (10) Patent No.: US 7,259,337 B1
(45) Date of Patent: Aug. 21, 2007

(54) ELECTRICAL GROUNDING AND SEALING OF MULTI-POSITION RAIN-TIGHT JUNCTION BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/393,202

(22) Filed: Mar. 30, 2006

Related U.S. Application Data (63) Continuation-in-part of application No. 11/264,484, filed on Nov. 1, 2005, now abandoned.

(51) Int. Cl.
*H02G 3/10* (2006.01)

(52) U.S. Cl. .............. 174/481; 174/485; 174/488; 174/50; 174/66; 248/906; 220/241

(58) Field of Classification Search .......... 174/481, 174/485, 488, 50, 66; 220/241, 3.2, 3.8, 220/4.02; 248/906; 439/535
See application file for complete search history.

(56) References Cited

U.S. PATENT DOCUMENTS

| | | | |
|---|---|---|---|
| 6,107,568 A * | 8/2000 | Schnell et al. | 174/61 |
| 6,527,302 B1 * | 3/2003 | Gault et al. | 285/125.1 |

* cited by examiner

*Primary Examiner*—Dhiru R. Patel (57) ABSTRACT

A rain tight multi-position conduit junction box kit with improved electrical grounding and sealing including a conduit junction box with a hollow junction box body having a top, a bottom, opposing side walls, a rear wall and an open front, and six apertures in the flat areas around each aperture and adapted for receiving four aperture cover plates and two fittings with an extra fitting which may be substituted for one of the cover plates in each of the top, bottom, rear wall and opposing side walls. The box has aperture cover plates for some of the apertures not used in a particular installation and conduit fittings for the remaining apertures used for the engagement of conduit.

8 Claims, 13 Drawing Sheets

ELECTRICAL GROUNDING AND SEALING OF MULTI-POSITION RAIN-TIGHT JUNCTION BOX

The present application is a continuation-in-part of U.S. patent application Ser. No. 11/264,484 filed on Nov. 1, 2005 abandoned, which application is referred to herein and incorporated in its entirety into the present application.

FIELD OF THE INVENTION

The present invention relates to junction boxes for electrical conduit and more particularly to such devices that can be adapted for multi-positional use and have improved electrical grounding and sealing of the attached aperture cover plates and fittings.

BACKGROUND OF THE INVENTION

Rain-tight exterior junction boxes for conduit are well known in the art and are generally designed to be used with conduit from about ½ inch trade size to about 4 inches trade size or more in diameter. Because of their use in conjunction with conduit, they are of a relatively large size, very rigid and relatively heavy. Additionally, the present devices have been supplied to accommodate right hand, left hand, top, and bottom directional conduit installations. Given their large size and weight, warehousing and handling of all of the various possible configurations that might be necessary for a variety of installations becomes very expensive due to the space and boxes required to store the number of different configurations necessary to meet any potential installation need.

There thus exists a need for a conduit junction box that can eliminate or reduce the need to store many multiples of configurations of what is essentially the same device to meet a variety of installation needs.

OBJECT OF THE INVENTION

It is therefore an object of the present invention to provide a rain-tight conduit junction box that is sufficiently flexible/modifiable as to meet the needs of a plurality of left hand, right hand, top and bottom conduit direction installations and at the same time have improved electrical grounding and sealing of fittings.

SUMMARY OF THE INVENTION

According to the present invention there is provided in combination: A) a raintight conduit junction box comprising: i) a hollow junction box body having a top, a bottom, opposing side walls, a rear wall and an open front; and ii) apertures on the body surrounded by a flat area for the optional addition of a conduit fitting having a flat area or a flat surfaced cover plate in each of the top, bottom, rear wall and opposing side walls and a second aperture in at least one of the side walls; B) aperture cover plates for any of the apertures that are not used in a particular installation; C) fittings for the engagement of conduit in apertures that engage inserted conduit; D) O-ring gaskets between the conduit junction box and aperture cover plates or fittings; and E) a kit that includes a combination of four cover plates or closures and three fittings of which one is an extra fitting. The cover plates and fittings have some of the same dimensions for fastening to the flat surface surrounding the apertures.

DETAILED DESCRIPTION

The disclosure of co-pending Ser. No. 11/264,484, mentioned above, was a multi-position rain-tight junction box that had flat gaskets. It was found that this was satisfactory but that if O-ring gaskets rather than flat gaskets are used, the electrical grounding is superior and eliminates the flowing of the flat gasket sideways as the fittings and aperture cover plates are tightened into position. O-ring seals are generally known. They have a groove into which an O-ring is placed with the height of the groove being slightly smaller than the O-ring prior to compression. As the O-ring is compressed by a fitting or cover plate, the O-ring is flattened and provides a seal. O-rings are generally circular but can be other annular shapes. They are generally made of a suitable rubber or other elastomer.

In the present invention, the surfaces in which the O-rings are located is a flat surface on the conduit box and compliments another flat surface on the fitting or aperture cover plate. Both the conduit box and fitting are metal and the two flat surfaces are tightened together, the superior electrical grounding is achieved.

It will be readily appreciated that the groove for the O-ring can be in the fixture or in the aperture cover plate rather than on the conduit box.

An important aspect of the present invention is to have a flat smooth metal surface surrounding each aperture to which a flat smooth metal surface of each aperture cover plate or fitting, with an O-ring gasket in a groove, which is compressed and held in position by screws or similar fasteners mounted to screw holes surrounding the aperture.

Referring now to the accompanying Figures, the conduit junction box 10 of the present invention comprises: a hollow body 12 defining an interior 14 and comprising an open front 16, opposing first side walls 18 and second side wall 20, a rear wall 22 a top 24 and a bottom 26. Each of opposing side walls 18 and 20 and rear wall 22 includes at least one aperture 28 with one of the side walls having a second aperture 28. Top and bottom, 24 and 26 respectively, include apertures 30. Provided as part of the combination claimed herein are aperture cover plates 32 that are used to seal any apertures 28 and 30, which are not used for the insertion of conduit using fittings 34 described below. A single faceplate 36 with flat gasket 37 is included in the combination to seal open front 16 after installation of conduit and connection of wires contained therein as described below.

Figure 1:
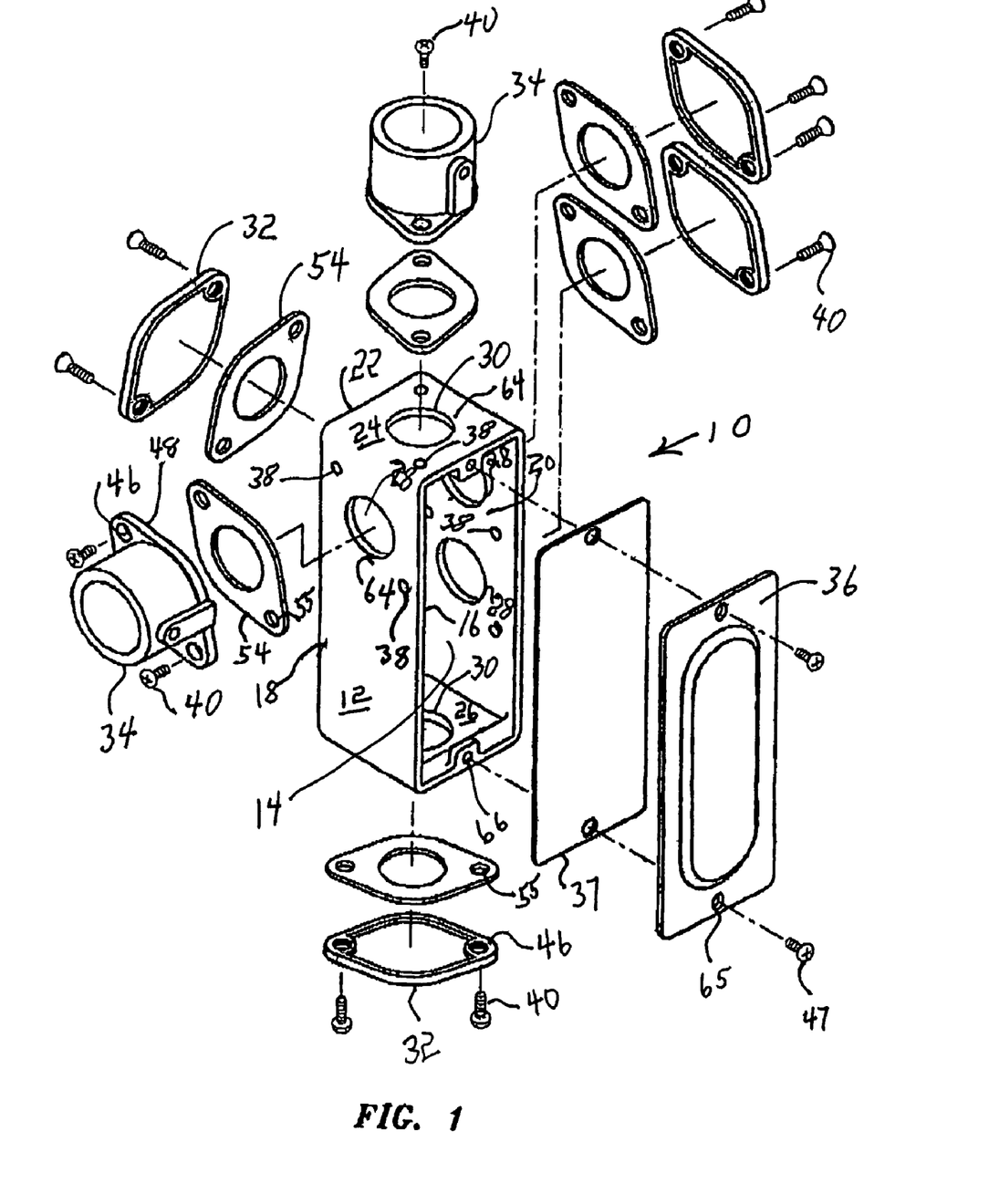
FIG. 1 is an exploded view of the multi-position conduit body with flat gaskets.
Figure 5:
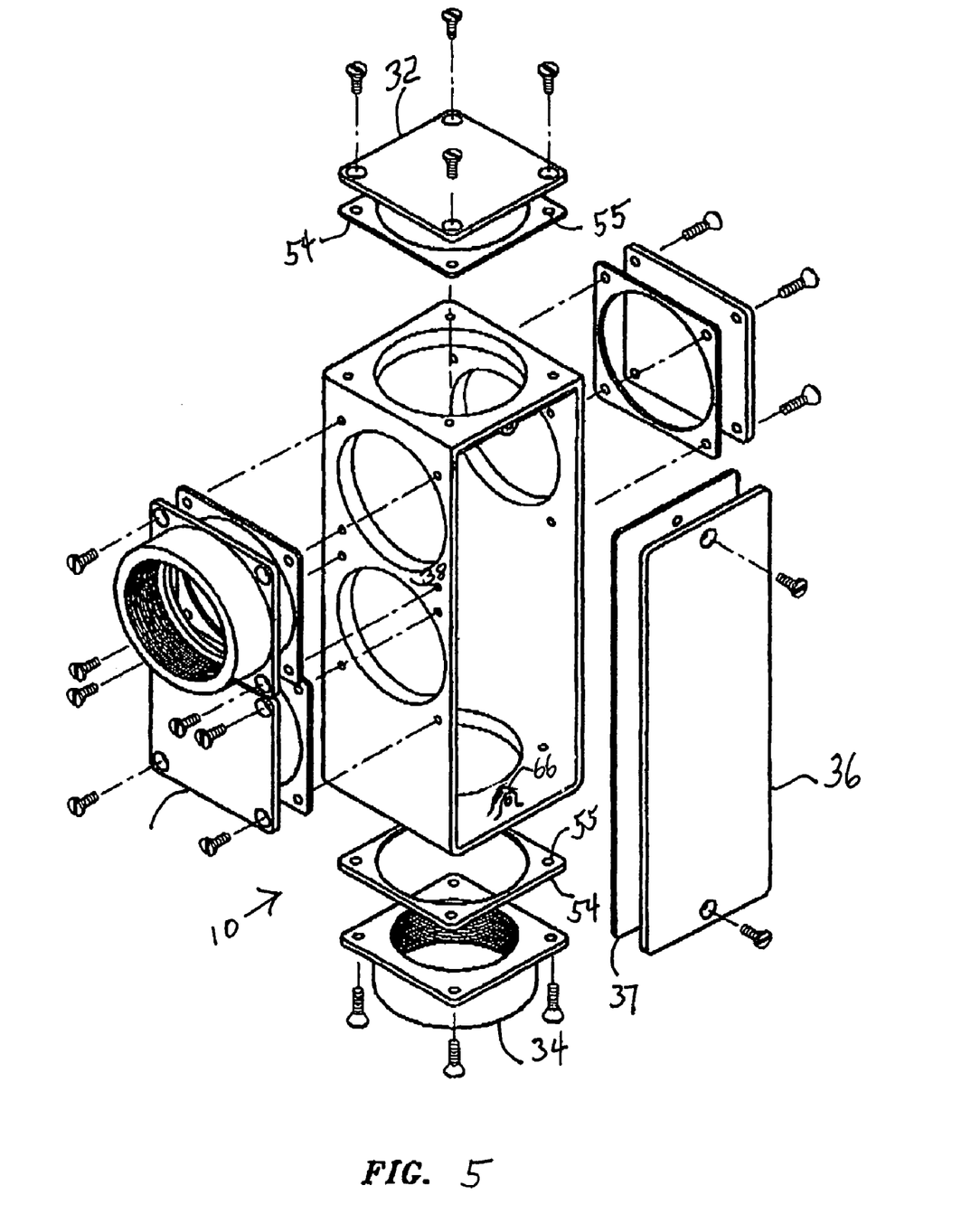
FIG. 5 is a schematic exploded view of another embodiment having a larger body and flat gaskets.
Figure 8:
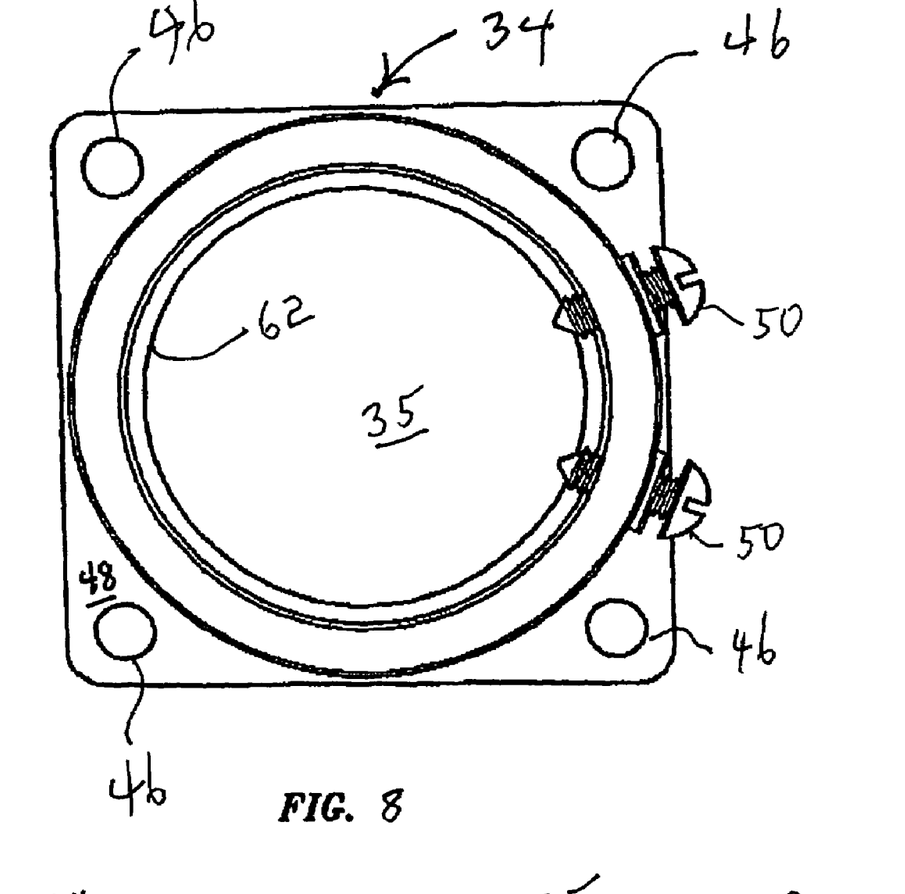
FIG. 8 is a top view of a fixture.
Figure 9:
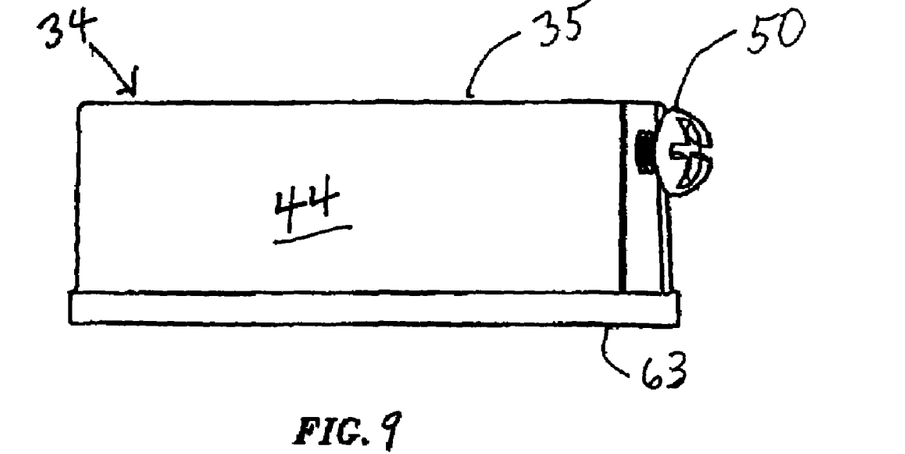
FIG. 9 is a side view of the fixture.

Referring now more specifically to the right opposing second side wall of FIG. 1, a pair of apertures 28 can be seen in side wall 20. Located at opposing corners about the periphery of apertures 28 are threaded screw holes 38. Threaded screw holes 38 serve as attachment points for cover plates 32 through the insertion and tightening of screws 40. The fittings 34, which are best seen in FIGS. 8 and 9, include an acceptance opening 35 for a conduit or similarly protected electrical cable, which is held in place either by the internal screw threads 62 or a similar arrangement. There may be a set screw 50 or similar locking arrangement. The flat surface 63 contacts the flat surface 64 surrounding apertures 28 and 30, as shown in FIGS. 1 and 5. An external portion 44 with thread 62 extends outward from interior 14 for receipt of a portion of threaded conduit or similar protected electrical cable. The entire fitting 34 is attached to rear wall 22, top wall 24, bottom wall 26, or side walls 18 and 20 through the tightening of screws 40 inserted through screw holes 46 in integral peripheral flange 48 about the periphery of external portion 44 and into threaded screw holes 38. External portion 44 is of a size to accept any desired diameter of conduit that will be installed using conduit junction box 10. The fittings 34 can be fabricated to accept a wide range of conduit diameters from, for example, ½ inch trade size up to or beyond 4 inch trade size in diameter conduit or similar type of electrical cable protectors.

In some instances, an integral member may be formed in the top 24 or bottom 26, but not both, rather than using the screwed on fitting 34.

Referring again to FIG. 1, faceplate 36 that serves to seal open front 16 is seen closing open front 16. Faceplate 36 is attached to conduit junction box 10 by screws 47 that are inserted in faceplate screw holes 65 and screwed into threaded screw holes 66.

Although not necessary in every installation of conduit junction box 10, according to a preferred embodiment of the invention, fittings 34 incorporate at least one set screw 50 for positive retention of a portion of threaded conduit (not shown) that is inserted into and threadedly engages external portion 44 of fittings 34. A plurality of two or more such set screws may also be used.

As can be seen in the figures, there is an unrecessed flat surface 64 adjacent to and around each aperture 28 and 30 and within this flat area are the threaded screw holes 38. These flat areas and threaded screw holes are interchangeable with each other in spacing and are spaced the same as the screw holes 46 in cover plates 32 and fittings 34. The flat surfaces on the cover plate and fittings are of a similar size and include the same spacing as the screw holes 46. Also, the gasket 54 for the fitting 34 and the cover plates 32 is inserted between the flat surfaces around each aperture 28 and 30 and the flat surfaces of the cover plates 32 and fittings has corresponding gasket screw holes 55 for passage of the screws 40.

Figure 6:
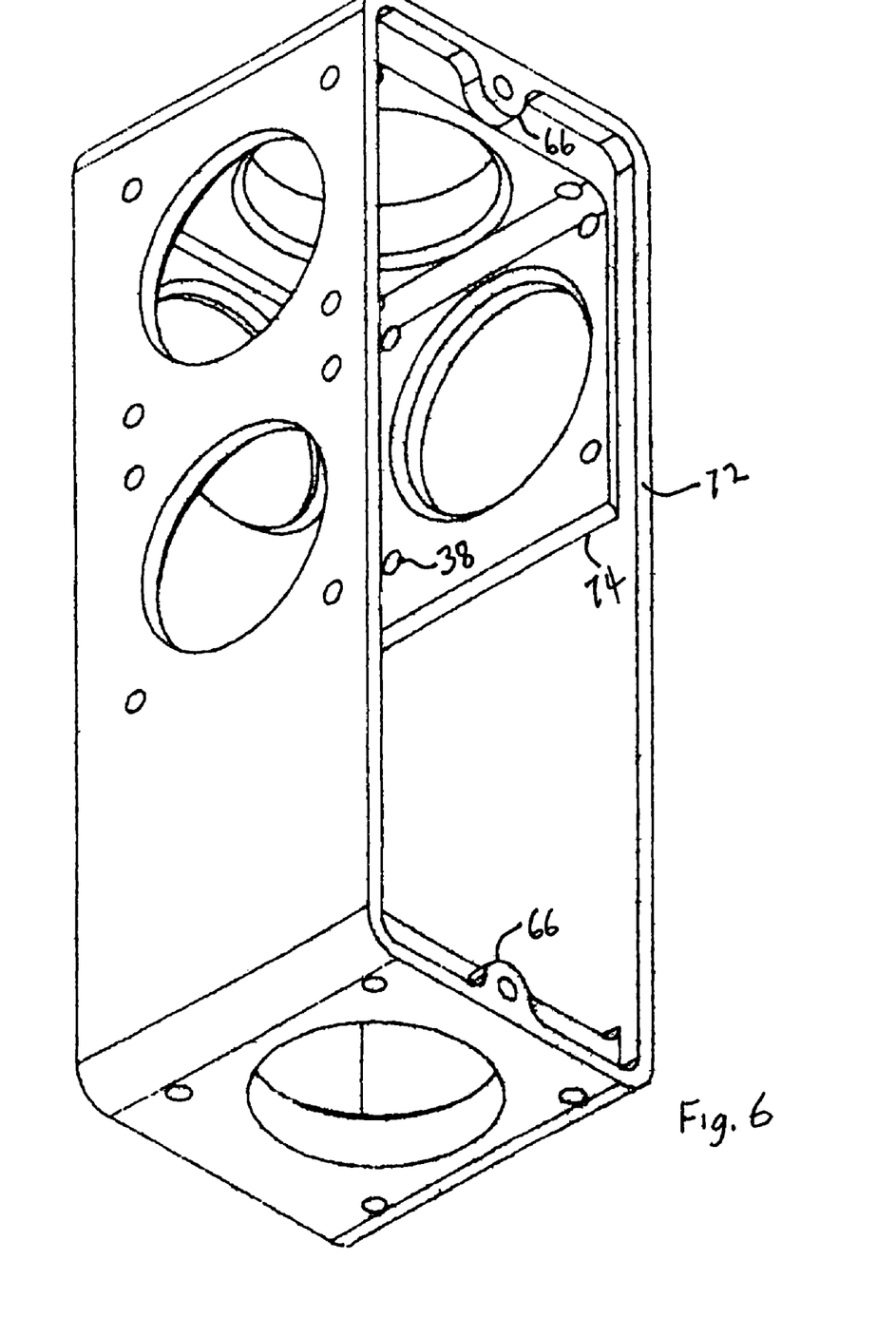
FIG. 6 is an isometric view of the hollow body of FIG. 5 showing greater details.

As shown in FIG. 6, the hollow body 12 of the conduit junction box has a regular wall thickness 72 of sufficient thickness for the intended usages of the conduit junction box but, in order to accommodate the needed depth of the threaded screw holes 38, the wall is of increased thickness 74.

Figure 7:
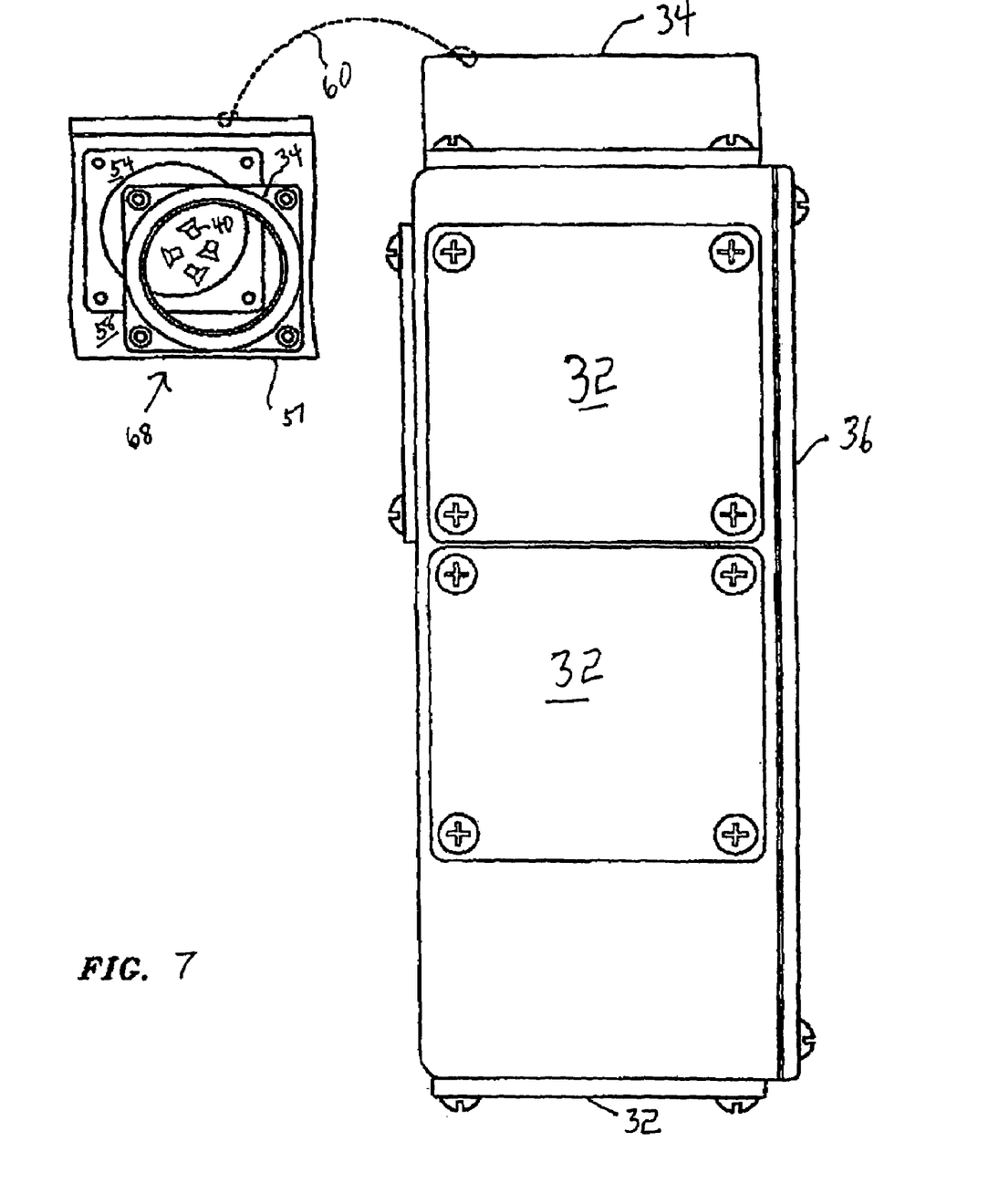
FIG. 7 is an assembled view of FIG. 5 but with the fixtures at a different location and the gaskets omitted from the conduit body.

An important aspect of this invention is to supply the conduit junction box 10 as a kit 68 that includes an extra fitting 34 with any set screws 50, screws 40, and gasket 54 with the remaining two fittings and four cover plates usually assembled with the conduit junction box 10. The kit 68 is held in the extra parts kit envelope 57 or other packaging tied to the conduit junction box by a plastic tie 60. This is shown schematically in FIG. 7, where the extra parts 58 are in an envelope 57 attached to the box 10 by a tie 60.

It is to be recognized that the kit 68 with the extra parts 58 may be included in or attached to the box 10 or may be taped to the box or included in the bag or container in which the box 10 is sold.

As will be readily apparent to the skilled artisan, conduit junction box 10 is applied through the attachment of appropriate incoming and outgoing sections of conduit in whatever direction is necessary (right, left, backward, up or down), insertion of the appropriate wiring, connection of the wiring as needed through open front 16 and then closure of open front 16 with faceplate 36 and gasket 37, and securing thereof with screws 47.

With reference to FIGS. 1 to 4 it is to be noted that in the smaller sizes, the aperture cover plates and fittings only have two screws 40 with the screw holes 46 arranged diagonally. This is important when attaching them to the hollow body 12.

For convenience, the terms top, bottom, and so forth are used herein, but it is to be understood the invention can be oriented in other directions and the claims are meant to cover other orientations.

Conduit junction box 10 and associated aperture cover plates 32, fittings 34 and front faceplate 36 may all be manufactured from any suitable material such as copper free cast aluminum, and malleable iron or similar materials used in the fabrication of electrical fitting elements. However, it is important that the conduit junction box 10 and fittings 34 be of an electrically conductive material.

The improved grounding and sealing multi-position conduit body is shown in the O-ring gasket embodiment of FIGS. 10 to 18 wherein the same numbers used in FIGS. 1-9 are used where appropriate but with new numbers added for the new elements.

Figure 10:
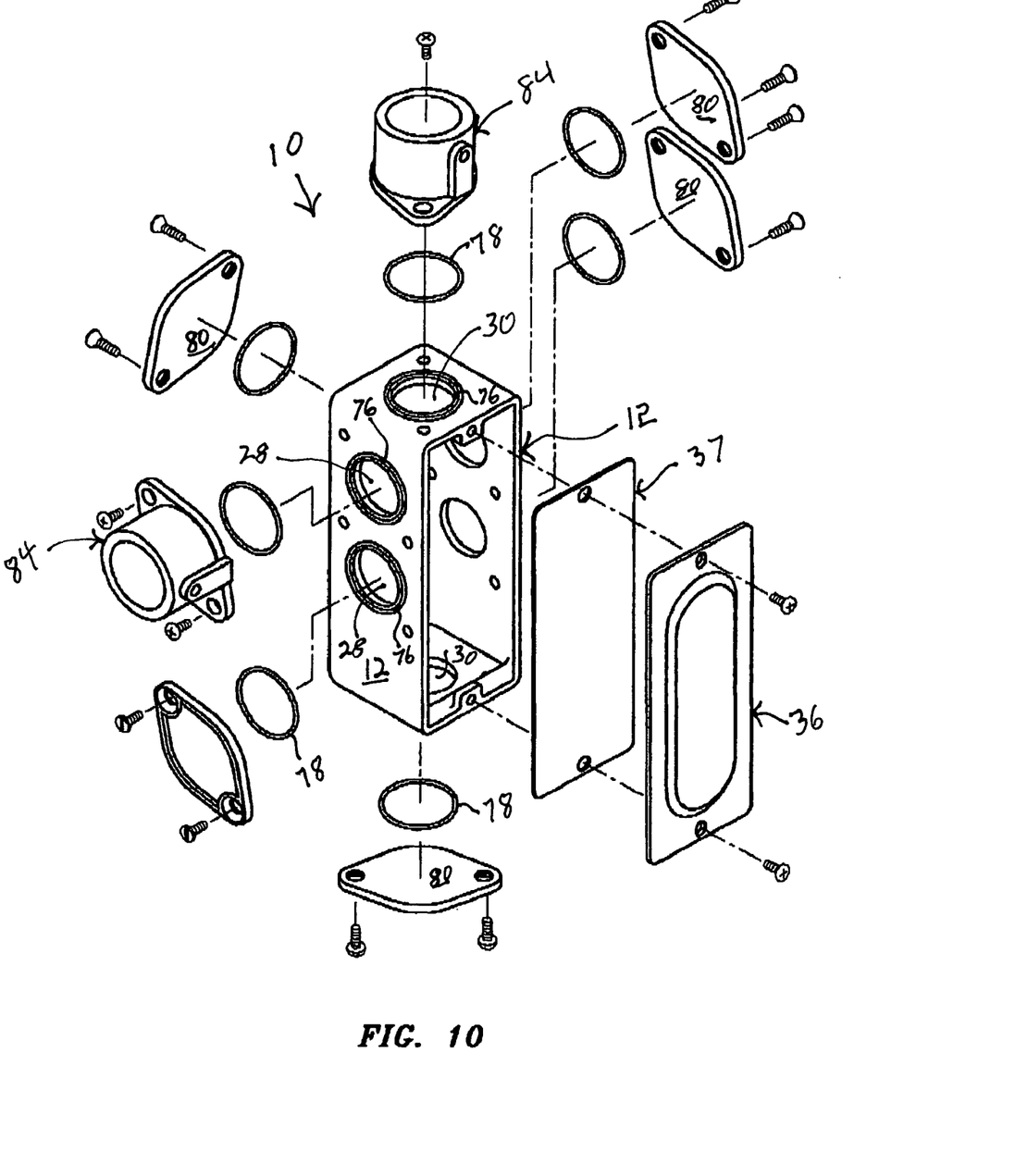
FIG. 10 is a view similar to FIG. 1 but having O-ring gaskets.

In FIG. 10 there is shown an exploded perspective view with the O-ring grooves 76 shown in the unrecessed flat area 64 around apertures 28 and 30.

To be placed in the O-ring grooves 76 are O-rings 78, which are adapted to be compressed by the flat areas 80 of the aperture cover plates and the flat areas 82 of the fittings (shown in FIGS. 12, 13, 14, and 16) until the seal is made and an augmented ground is provided between the fitting 84 and the hollow body 12.

Figure 13:
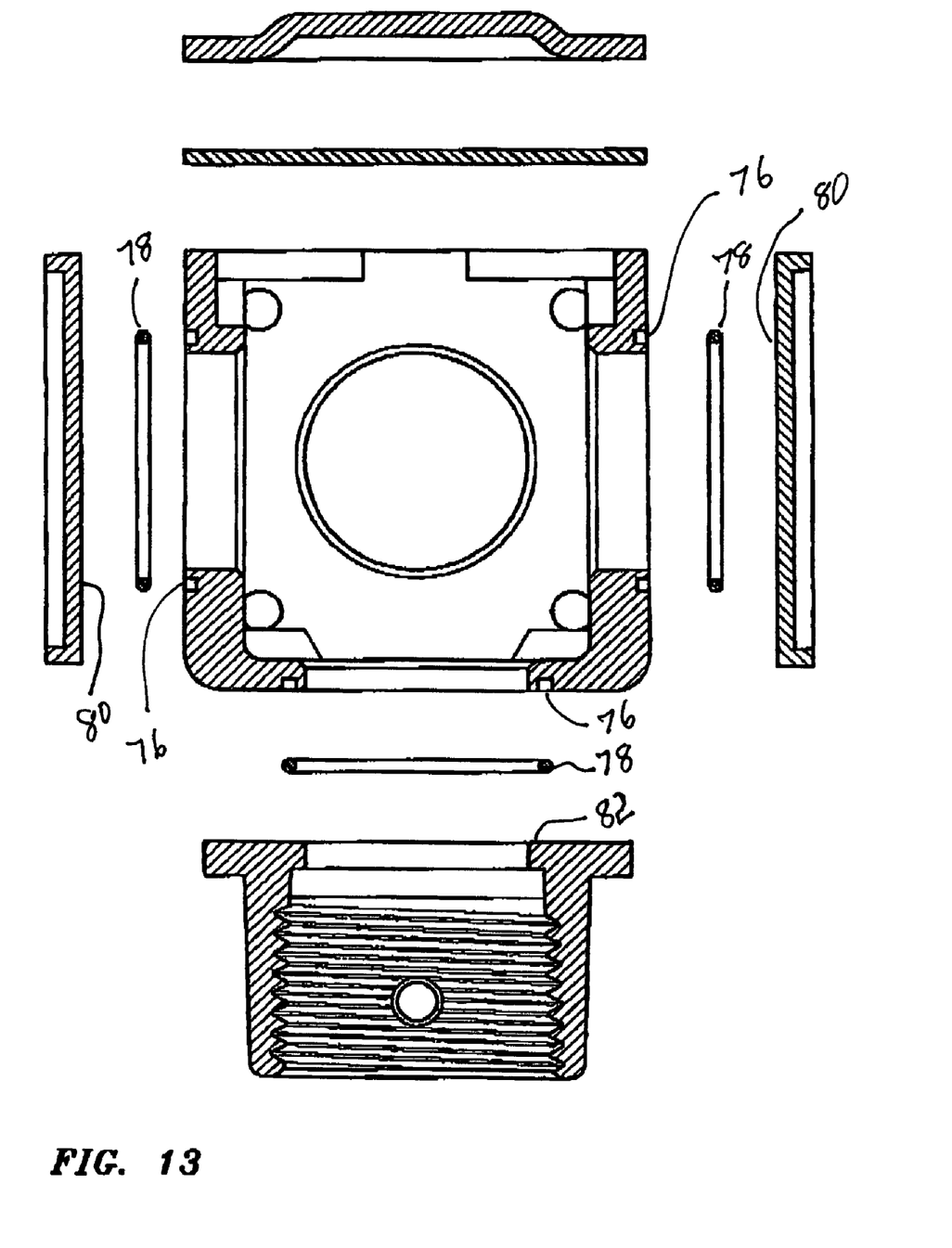
FIG. 13 is an exploded sectional view of one end showing the O-ring grooves, O-rings, and flat cover plates and flat fixtures.

With reference to FIG. 13, there is shown a sectional exploded view showing the O-ring grooves 76, O-rings 78, and flat areas 80 of aperture cover plates and flat areas 82 of fittings 84.

Figure 14:
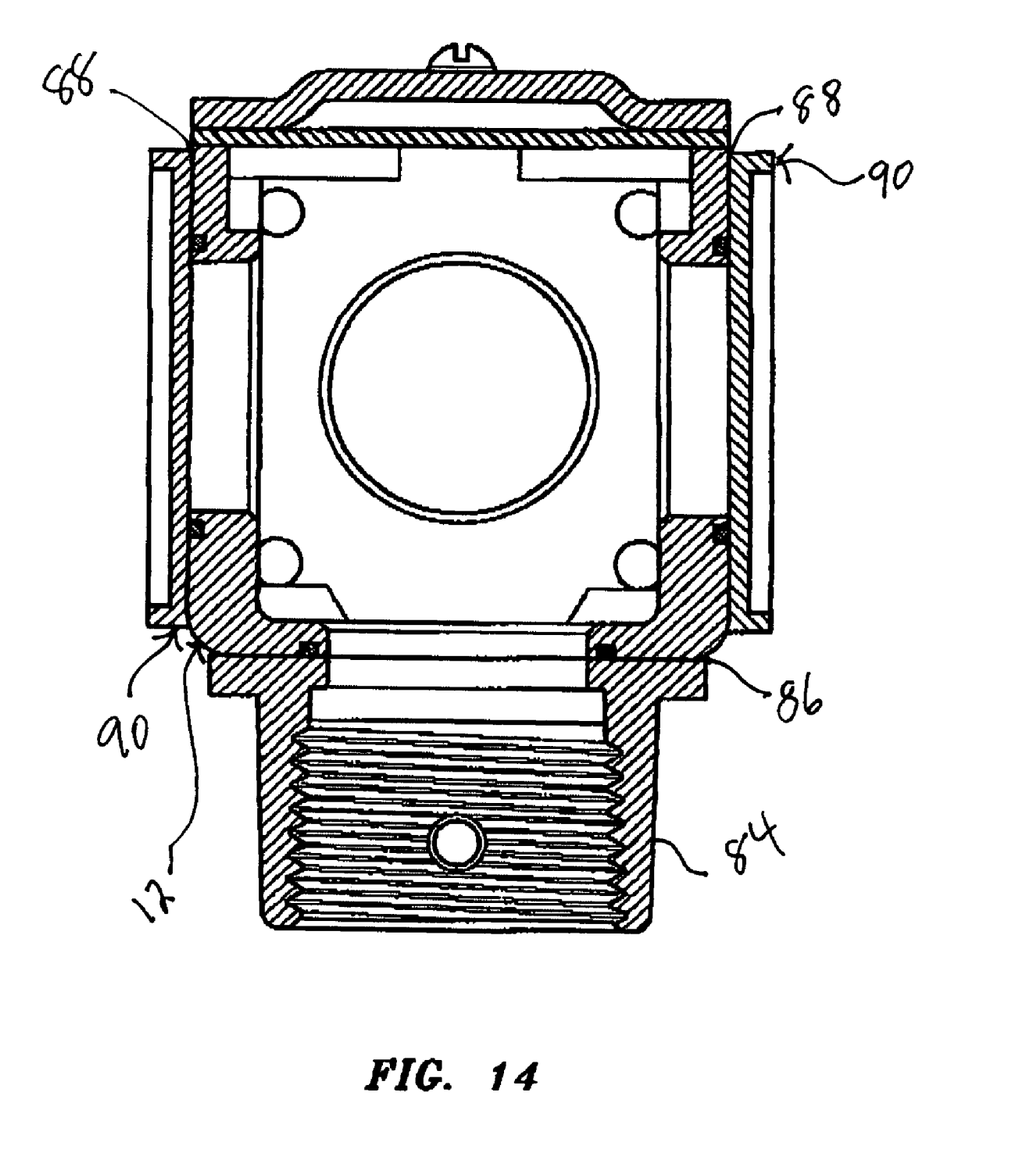
FIG. 14 is an assembled sectional view of FIG. 13.

FIG. 14 is the assembled view of FIG. 13 and shows the metal-to-metal contact 86 between the fitting 84 and the hollow body 12. Also shown is the sealing 88 between the aperture cover plates 90 and the body 12 through compression of the O-rings 78. The hollow body 12 is closed by the faceplate cover 36, which is sealed by the flat gasket 37.

Figure 2:
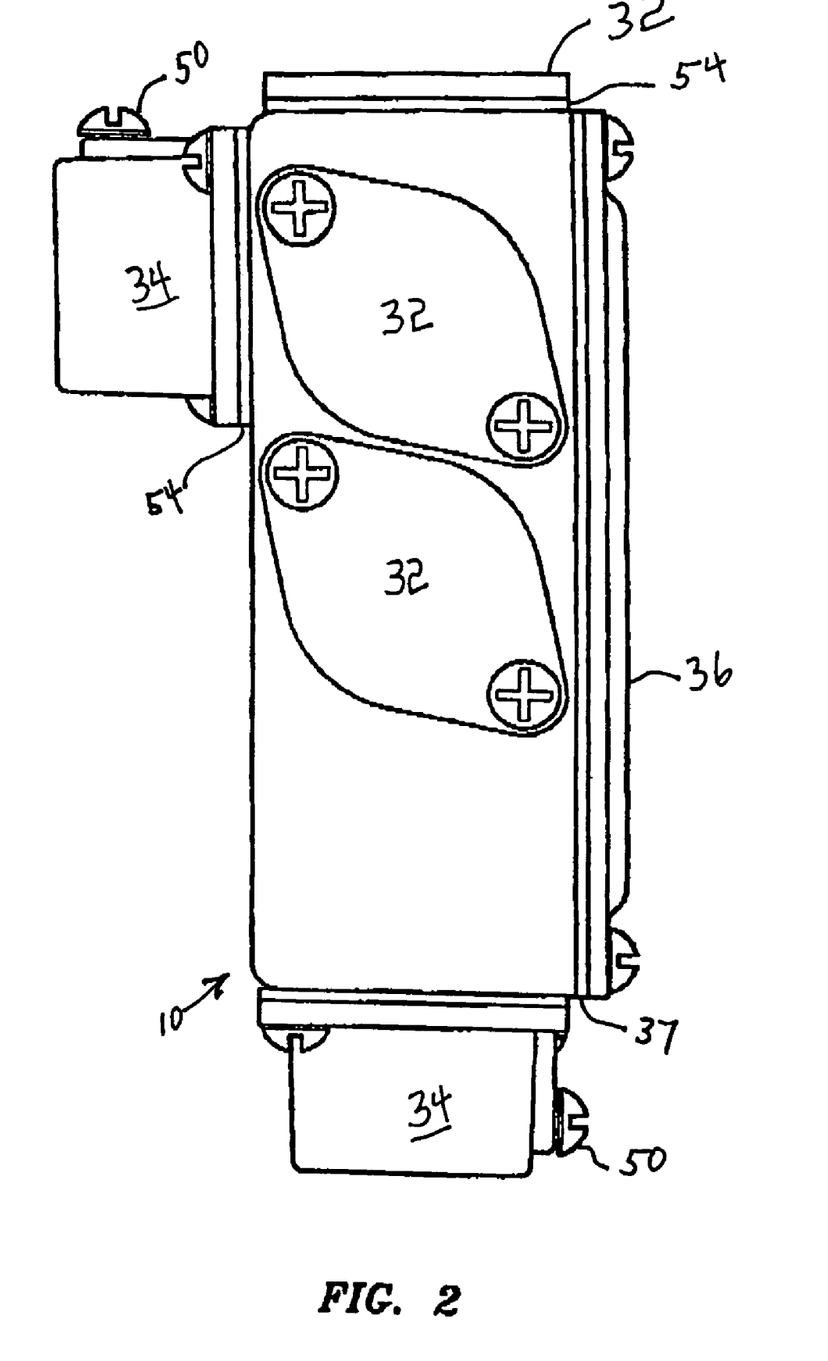
FIG. 2 is an assembled view similar to the body of FIG. 1, but in a different orientation and arrangement of cover plates and fittings.
Figure 11:
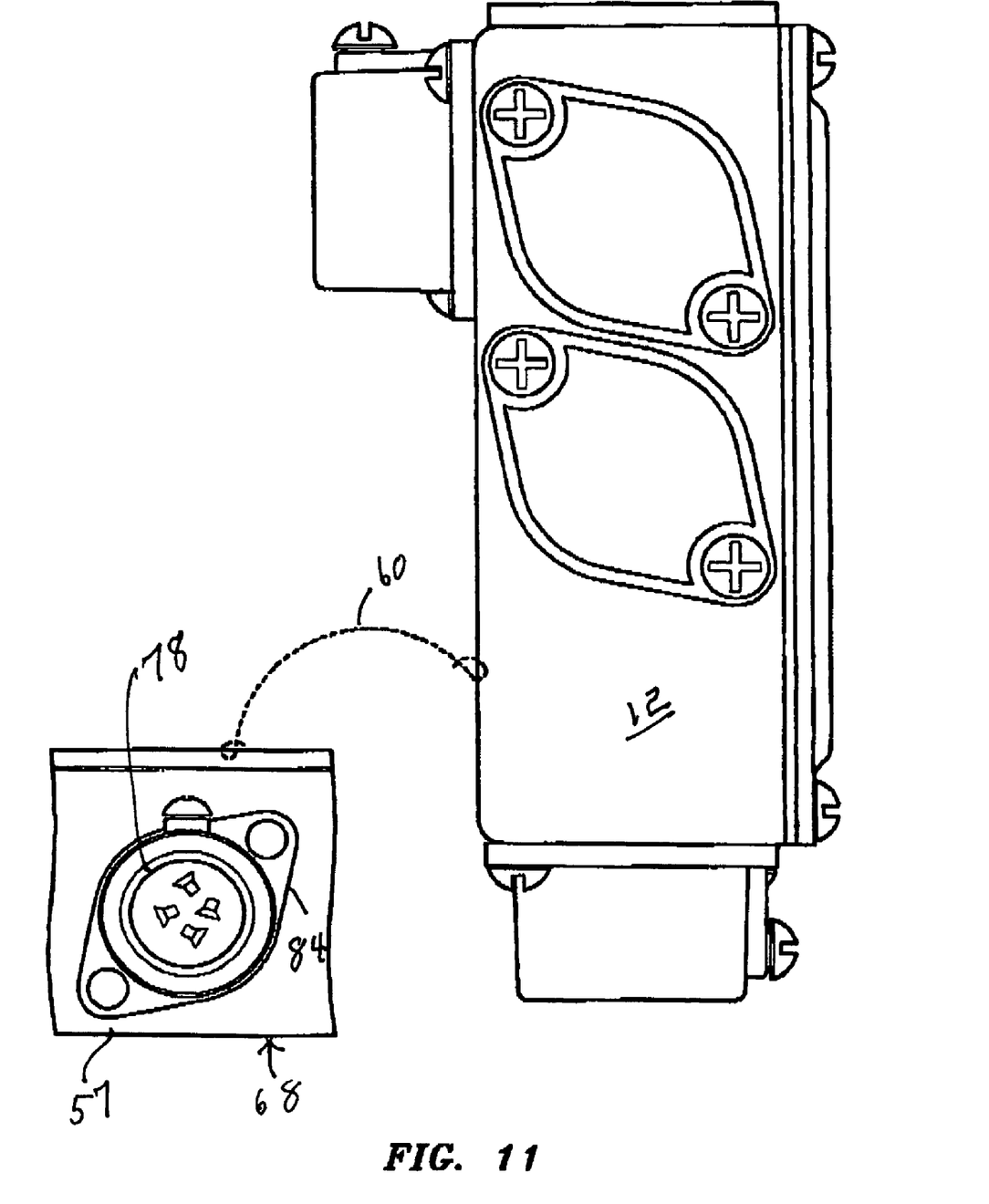
FIG. 11 is a view similar to FIG. 2 but having O-ring gaskets hidden from view.

With reference to FIG. 11, there is shown a view similar to FIG. 2, but the O-rings are hidden from view. FIG. 11 also illustrates a kit 68, but in this case, the fitting 84 has a flat area 82 (not shown) and an O-ring 78 in place of the flat gasket.

Figures 12, 15:
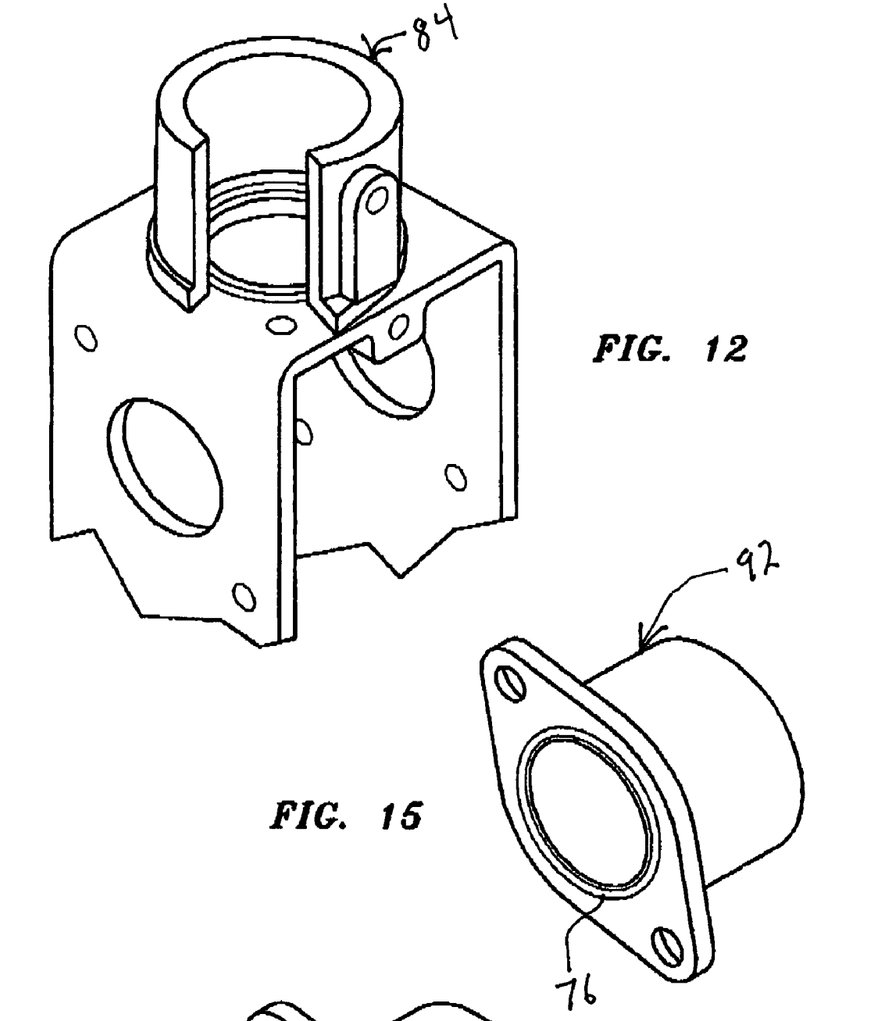
FIG. 12 is a perspective partial view of a fixture laid on one end with an O-ring groove.
FIG. 15 is a perspective view where the O-ring groove is in the fixture.

FIG. 12 shows a partially broken away view of a fitting 84 located on the body 12. A more detailed view is shown in FIG. 14, where it is shown how the fitting 84 contacts the body 12 along metal-to-metal contact 86.

FIG. 15 shows a fitting 92 with an O-ring groove 76. While applicant prefers the O-ring grooves 76 be in the body 12, it would work just as well if the o-ring groove is located in the flat area of the fitting and aperture cover plate with the surface around the apertures being flat without an O-ring groove.

Figure 16:
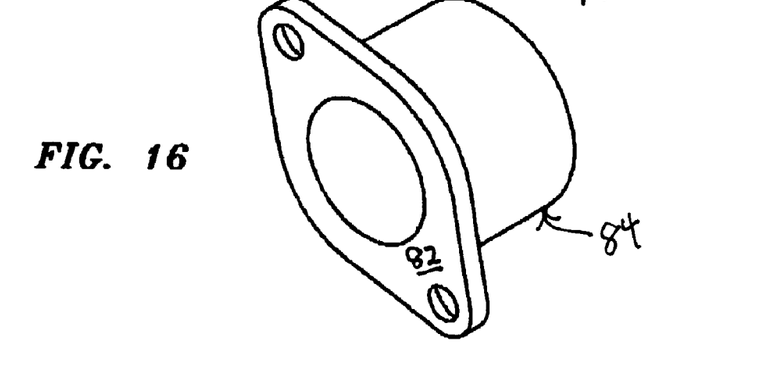
FIG. 16 is similar to FIG. 15 except the O-ring groove is not in the fixture.

FIG. 16 shows the fitting 84, which has a flat area 82 but no O-ring groove.

Figure 3:
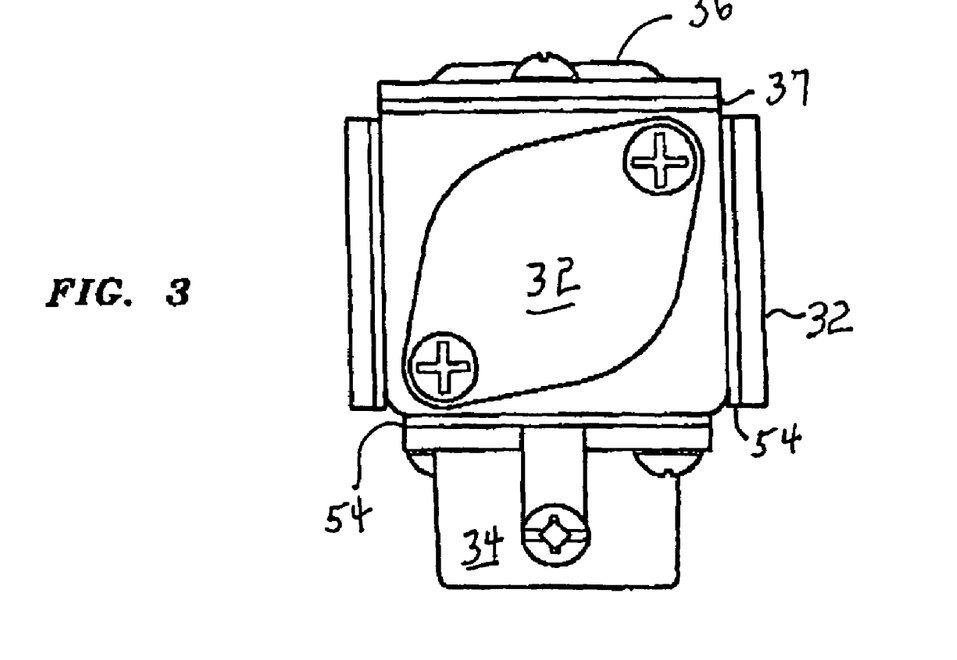
FIG. 3 is an assembled view of the body of FIG. 1 as seen from the bottom but with one fitting at a different location.
Figure 4:
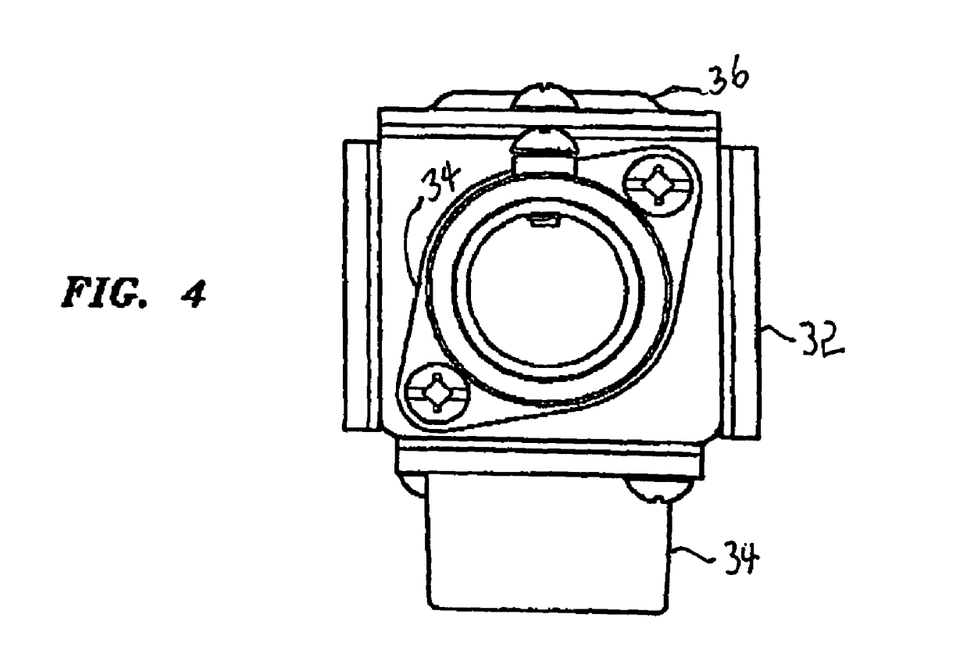
FIG. 4 is an assembled view of the body of FIG. 1 as seen from the top but with one fitting at a different location.
Figure 17:
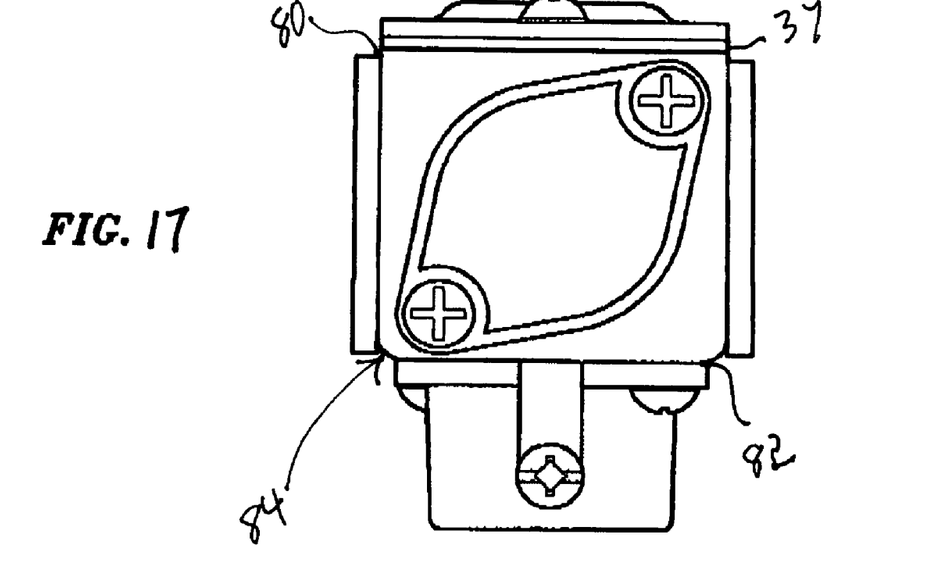
FIG. 17 is a view similar to FIG. 3 wherein O-rings are used and hidden from view.
Figure 18:
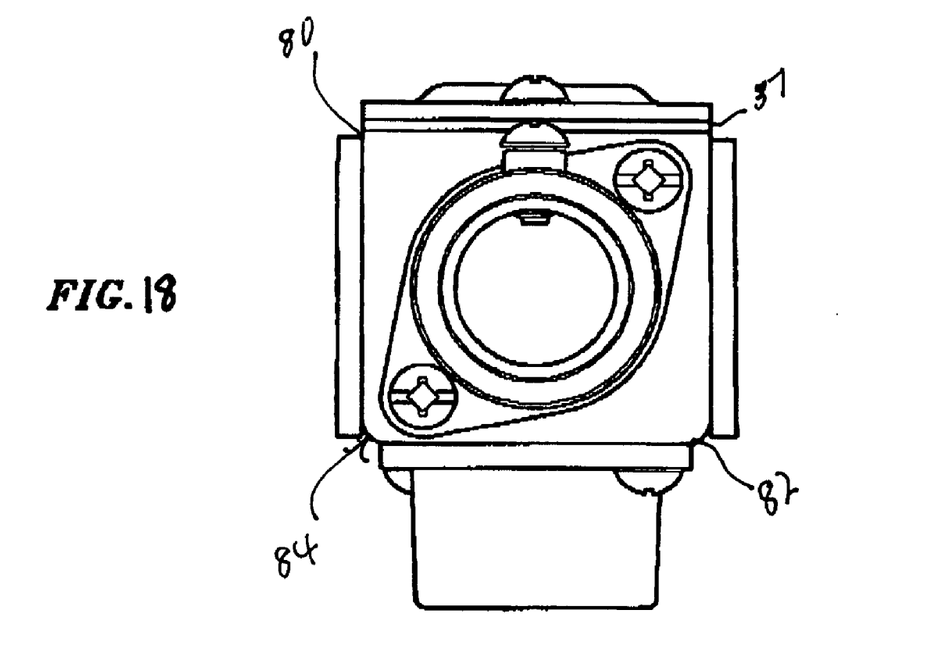
FIG. 18 is a view similar to FIG. 4 wherein O-rings are used and hidden from view.

FIGS. 17 and 18 show views similar to FIGS. 3 and 4 but since these are the O-ring gasket embodiment, the seals are hidden whereas in FIGS. 3 and 4, the edge of the flat gasket 54 can be seen.

There has thus been described a multi-positional/directional rain tight conduit junction box kit that is readily adaptable to virtually any installation without the need for the inventorying of a variety of left or right handed or other variants of such a box.

As the invention has been described, it will be apparent to those skilled in the art that the same may be varied in many ways without departing from the spirit and scope of the invention. Any and all such modifications are intended to be included within the scope of the appended claims.

What is claimed is:

1. A rain-tight multi-position electrically conductive conduit body with augmented electrical contact having augmented grounding and using O-ring for sealing comprising in combination:
   A) a conduit box of electrically conductive material comprising:
      a hollow body having a top wall, a bottom wall, opposing side walls, a rear wall, and an open front;
      an unrecessed aperture in each of the rear and opposing side walls with a second unrecessed aperture in one of said side walls and an unrecessed aperture in at least one of said bottom wall or said top wall;
      an unrecessed flat surface adjacent to and surrounding each of said unrecessed apertures; and
      threaded holes in said unrecessed flat surface;
   B) a front cover plate for said open front;
   C) aperture cover plates having at least a partial flat surface adapted to marry to said unrecessed flat surface of said apertures;
   D) screw holes in said aperture cover plate flat surface;
   E) fittings of electrically conductive material comprising:
      an external portion that engages a conduit or other electrical cable protector that is carried thereinto;
      a flange having a partial flat surface adapted to marry to said unrecessed flat surface surrounding each of said apertures; and
      screw holes in said flange;
   F) an O-ring groove located in either said unrecessed flat surface surrounding each of said apertures or in said aperture cover plate flat surface and said flange flat surface;
   G) said O-ring inserted into said groove; and
   H) screws for insertion into said screw holes of said aperture cover plates and said screw holes of said fittings and tightened into said mating threaded holes to compress said O-ring whereby said partial flat fitting is tightened to the unrecessed flat surface surrounding said unrecessed surface of said apertures of said conduit box with sufficient electrical contact to provide augmented grounding.

2. The multi-position conduit body of claim 1 wherein said fittings and said apertures are on both said bottom and said top wall.

3. The multi-position conduit body of claim 2 wherein said fittings are internally threaded.

4. The multi-position conduit body of claim 3 further including at least one set screw in said internally threaded fittings for the retention of threaded conduit threaded therein.

5. The multi-position conduit body of claim 1 further including at least one set screw in said fitting for the retention of conduit inserted therein.

6. The multi-position conduit body of claim 1 which includes a kit distributed and carried with said conduit body having an extra fitting and extra screws and an extra O-ring.

7. The multi-position conduit body of claim 1 wherein said O-ring grooves are located in said aperture cover plate flat surface and in said flange flat surface.

8. The multi-position conduit body of claim 1 wherein said conduit box and said fittings are metal.

* * * * *